(12) United States Patent
Green et al.

(10) Patent No.: US 12,428,134 B1
(45) Date of Patent: Sep. 30, 2025

(54) ADJUSTABLE SPRING LINK

(71) Applicant: Textron Innovations Inc., Providence, RI (US)

(72) Inventors: Sam Aaron Green, Derby, KS (US); Thomas Edward Orgera, Andover, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 39 days.

(21) Appl. No.: 18/623,862

(22) Filed: Apr. 1, 2024

(51) Int. Cl.
*B64C 13/28* (2006.01)

(52) U.S. Cl.
CPC .................. *B64C 13/28* (2013.01)

(58) Field of Classification Search
CPC ......... B64C 13/28; B64C 13/30; B64C 13/32; B64C 13/34
See application file for complete search history.

(56) References Cited

U.S. PATENT DOCUMENTS

| | | | |
|---|---|---|---|
| 2005/0051671 A1* | 3/2005 | Djuric | B64C 13/30 244/233 |
| 2010/0059238 A1* | 3/2010 | Kovach | A01C 7/203 172/570 |
| 2014/0263848 A1* | 9/2014 | Hagerott | B64C 13/345 244/223 |

* cited by examiner

Primary Examiner — Justin M Benedik
(74) Attorney, Agent, or Firm — SLATER MATSIL, LLP (57) ABSTRACT

An adjustable spring link can include a main attachment flange portion with a main attachment hole therein, a first spring attachment flange portion with a first spring attachment hole therein, and a second spring attachment flange portion with a second spring attachment hole therein. The first spring attachment hole can be separated from the main attachment hole by a first spaced distance. The second spring attachment hole can be separated from the main attachment hole by a second spaced distance less than the first spaced distance. The adjustable spring link can provide a mechanical coupling interposed between an elevator spring of an aircraft and either a structural frame member or an elevator control member of the aircraft. The adjustable spring link can provide multiple spring expansion lengths by providing multiple spring attachment options for the elevator spring via the first spring attachment hole and the second spring attachment hole.

20 Claims, 7 Drawing Sheets

ADJUSTABLE SPRING LINK

TECHNICAL FIELD

The present disclosure relates generally to extension springs used in aircraft flight controls and other system, and, in particular embodiments, to an adjustable spring link in elevator spring systems for aircraft.

BACKGROUND

Generally in an aircraft, an elevator is a primary aerodynamic control surface for controlling the pitch of the aircraft. Typically, the elevator is a movable aerodynamic control surface located on the horizontal stabilizer at the tail of the aircraft. The pitch attitude of an aircraft refers to the rotation of the aircraft around its lateral axis, causing the nose of the aircraft to pitch up or down, which generally translates to up-and-down movement of the aircraft during flight.

When the elevator is raised, it creates an aerodynamic downforce on the tail of the aircraft, which causes the nose of the aircraft to pitch up. And when the elevator is lowered, it creates an aerodynamic upforce on the tail of the aircraft, which causes the nose of the aircraft to pitch down. The elevator contributes to the overall stability and control of the aircraft.

During takeoff, the aerodynamic forces acting on the elevator push the tail downward and thereby raise the nose upward, which causes the aircraft to climb in altitude. During landing, the elevator controls the descent rate and angle of the aircraft for touchdown. Elevator downforce in the context of an aircraft refers to the additional force generated by the aerodynamic control surfaces of the elevator to control the pitch attitude of the aircraft, which is the upward and downward orientation of the aircraft nose.

By applying elevator movement, the pilot can adjust the pitch of the aircraft. Typically in a relatively small and relatively inexpensive aircraft, an elevator is hinged to the horizontal stabilizer and its movement about the hinge is controlled by the pilot moving the aircraft's control yoke or stick via a set of elevator control linkages. When the pilot pushes the control yoke or stick forward, then via the elevator control linkages, the elevator moves downward about the hinge causing the nose to pitch downward. Conversely, when the pilot pulls the control yoke or stick backwards, then via the elevator control linkages, the elevator moves upward about the hinge causing the nose the pitch upward. The degree and rate of upward or downward tilt of the nose is proportional to the control input provided by the pilot on the control yoke or stick.

In some aircraft, especially relatively smaller aircraft, one or more elevator downforce springs are incorporated in the elevator linkage system to assist in providing elevator downforce. The elevator downforce spring(s) helps to counterbalance the aerodynamic loads on the elevator and makes it easier for the pilot to control the aircraft pitch by reducing the control forces required by the pilot to move the elevator, which can make the aircraft more manageable and less fatiguing on the pilot during flight.

Typically, elevator downforce springs are sized and configured to apply a spring force that helps bring the elevator to a neutral position, which helps to stabilize the neutral position for maintaining level flight. This spring force also provides a centering force that helps return the elevator to a neutral position when the pilot releases the control input or as the pilot reduces input on the control yoke or stick. This added spring force enhances stability and contributes to the overall controllability of the aircraft. Thus, the amount of spring force applied by the elevator downforce spring(s) is important to be balanced and tuned for the specific aerodynamic forces experienced for a given aircraft, as part of the aircraft design, configuration, and maintenance.

SUMMARY

An adjustable spring link embodiment can include a main attachment flange portion, a first spring attachment flange portion, and a second spring attachment flange portion. In the embodiment, the main attachment flange portion can have a main attachment hole therein. In the embodiment, the first spring attachment flange portion can have a first spring attachment hole therein. In the embodiment, the second spring attachment flange portion can have a second spring attachment hole therein, where the first spring attachment hole is separated from the main attachment hole by a first spaced distance, where the second spring attachment hole is separated from the main attachment hole by a second spaced distance, where the first spaced distance is greater than the second spaced distance, where the adjustable spring link is configured to provide a mechanical coupling interposed between an elevator spring of an aircraft and either a structural frame member or an elevator control member of the aircraft, and where the adjustable spring link is configured to provide multiple spring expansion lengths by providing multiple spring attachment options for the elevator spring via the first spring attachment hole and the second spring attachment hole.

An aircraft embodiment can include a structural frame member, an elevator control member, a first elevator spring, and a first adjustable spring link. In the embodiment, the first elevator spring can have a first spring end and a second spring end, and the first spring end of the first elevator spring can be mechanically coupled to and supported by the structural frame member. In the embodiment, the first adjustable spring link can have a first main attachment hole, a first spring attachment hole, and a second spring attachment hole, where the first spring attachment hole is separated from the first main attachment hole by a first spaced distance, where the second spring attachment hole is separated from the first main attachment hole by a second spaced distance, where the first spaced distance is greater than the second spaced distance, where the first adjustable spring link is mechanically coupled to the elevator control member via the first main attachment hole, and where the second spring end of the first elevator spring is mechanically coupled to the first adjustable spring link via the first spring attachment hole or the second spring attachment hole.

An aircraft embodiment can include a structural frame member, an elevator control member, an elevator spring, and an adjustable spring link. In the embodiment, the adjustable spring link can include a main attachment flange portion, a first spring attachment flange portion, and a second spring attachment flange portion. In the embodiment, the main attachment flange portion can have a main attachment point. In the embodiment, the first spring attachment flange portion can have a first spring attachment point. In the embodiment, the second spring attachment flange portion can have a second spring attachment point, where the first spring attachment point is separated from the main attachment point by a first spaced distance, where the second spring attachment point is separated from the main attachment point by a second spaced distance, where the first spaced distance is greater than the second spaced distance, where the adjustable spring link is configured to provide a mechanical coupling interposed between the elevator spring and either the structural frame member or the elevator control member, and where the adjustable spring link is configured to provide multiple spring expansion lengths by providing multiple spring attachment options for the elevator spring via the first spring attachment point and the second spring attachment point.

BRIEF DESCRIPTION OF THE DRAWINGS

The above and other features and advantages of the present disclosure can be more apparent based on the following detailed description taken in conjunction with the accompanying drawings, in which.

DETAILED DESCRIPTION OF ILLUSTRATIVE EMBODIMENTS

Referring now to the drawings, wherein like reference numbers may be used herein to designate like or similar elements throughout the various views, illustrative and example embodiments are shown and described. The figures are not necessarily drawn to scale, and in some instances the drawings can be exaggerated or simplified in places for illustrative purposes. One of ordinary skill in the art can appreciate many possible applications and variations for other embodiments based on the following illustrative and example embodiments provided in the present disclosure.

Some embodiments of the present disclosure include one or more adjustable spring links to provide an adjustable elevator spring system in an aircraft. Some embodiments provide an advantage and function to adjust or change the amount of spring force provided by a same elevator spring within an elevator linkage system to balance and tune the elevator linkage system for the specific aerodynamic forces experienced for a given aircraft, or as part of the aircraft design, configuration, maintenance, or any combination thereof. Some embodiments provide an advantage and function to provide multiple attachment points on an adjustable spring link for securing an end of an elevator spring within an elevator linkage system of an aircraft.

Prior elevator spring systems have little or no adjustment to account for spring force tolerances. Typical methods for adjusting the spring tension make use of turnbuckles, which may only provide small amounts of spring force adjustment due to the short amount of length available within the adjustments.

More complicated designs would likely be difficult for mechanics to setup, maintain, and add unwanted weight to the aircraft. Some embodiments of present disclosure provide advantages of an elevator spring adjustment solution that is relatively simple, reliable, light weight, low in cost to manufacture, easy to adjust without necessarily requiring removal of other hardware, and providing several inches of spring extension adjustability greater than a typical turnbuckle alternative.

Maintaining stock or inventory of different lengths, diameters, and spring rates of elevator springs for a wide variety of aircraft is not practical for most parts distributors and repair shops. Some embodiments of the present disclosure provide an advantage of providing multiple spring force options using a single or an original elevator spring.

Figure 1:
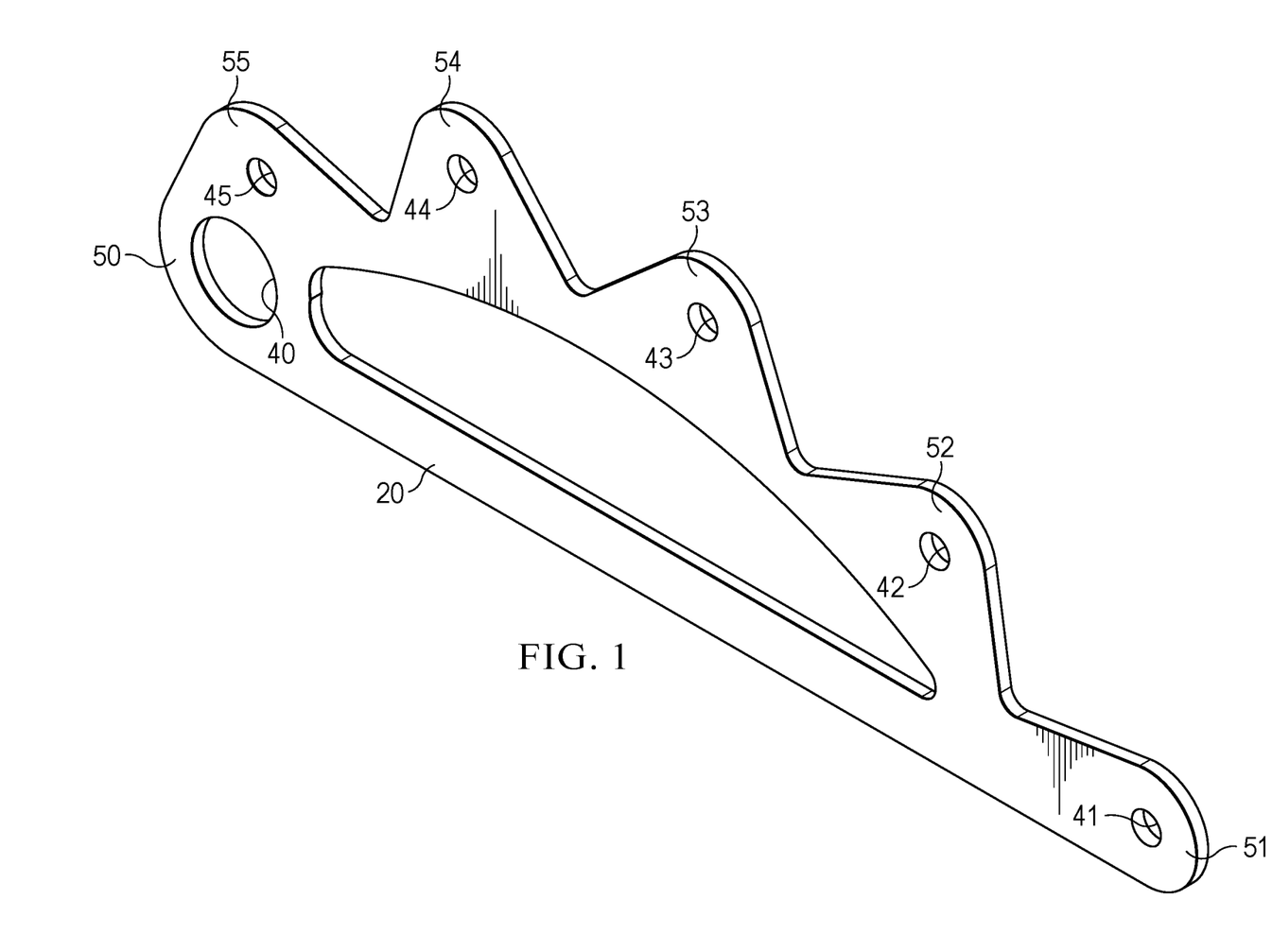
FIG. 1 is perspective view of an adjustable spring link according to some embodiments.
Figure 2:
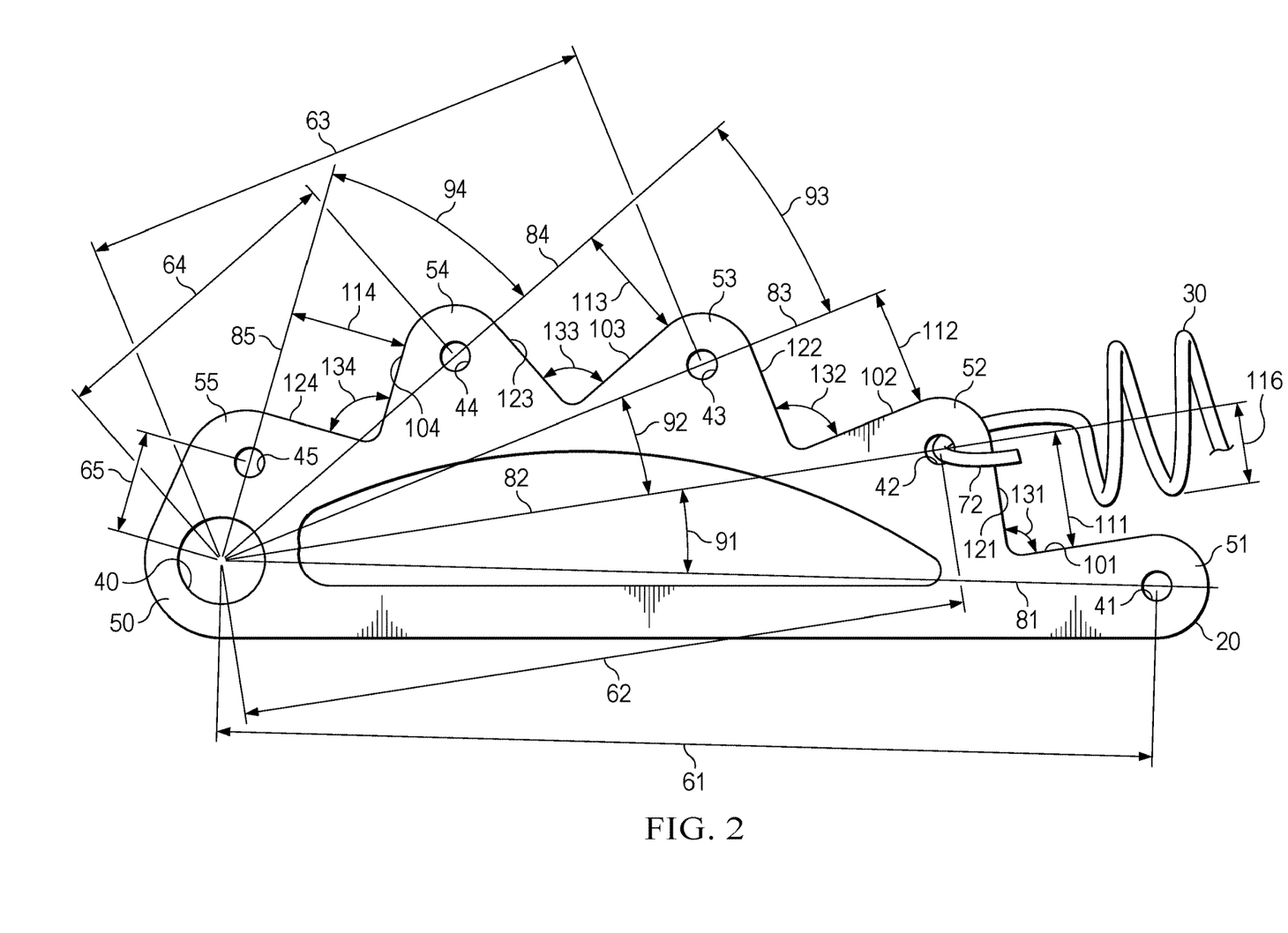
FIG. 2 is side view of an adjustable spring link according to some embodiments.
Figure 3:
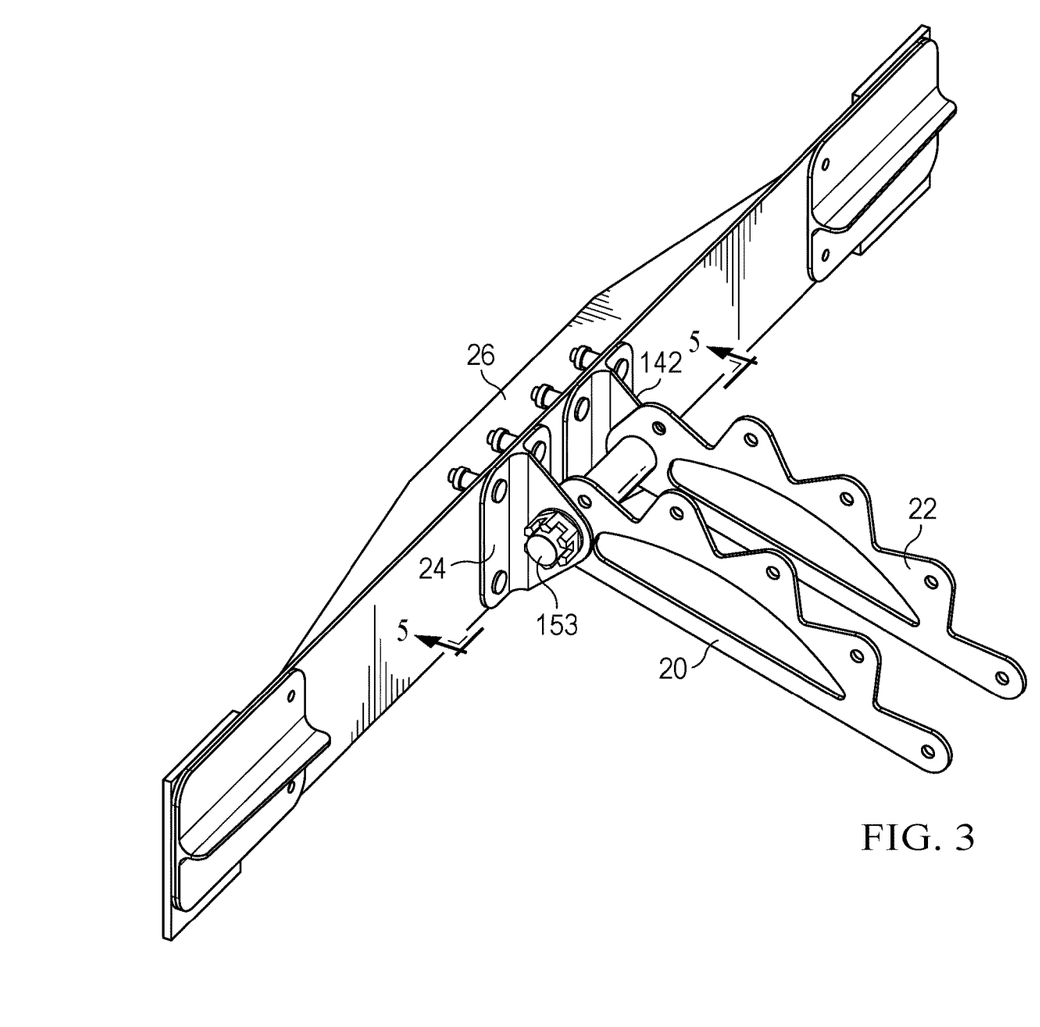
FIG. 3 is perspective view of two adjustable spring links mechanically coupled to elevator components according to some embodiments.
Figure 4A:
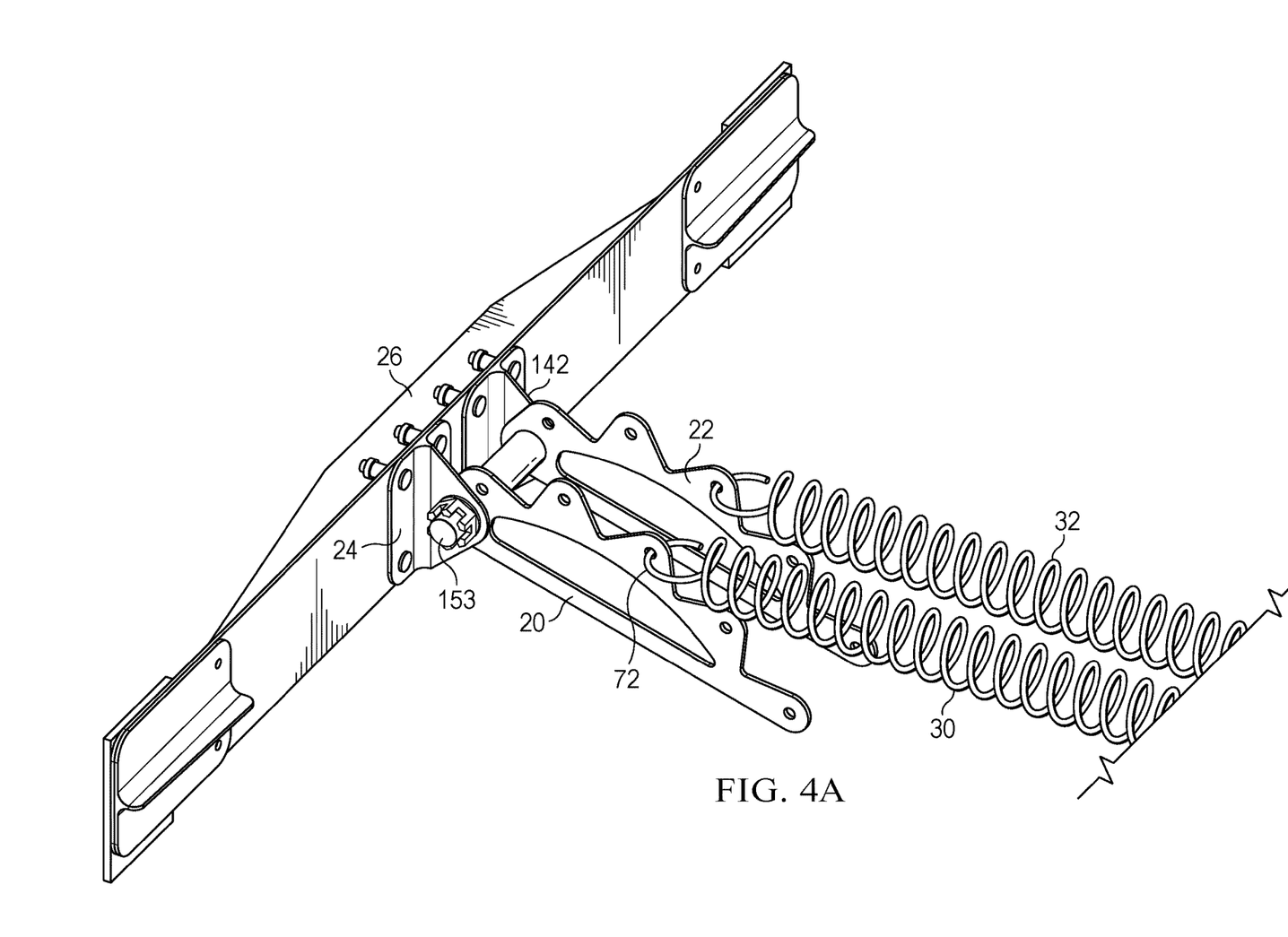
FIGS. 4A and 4B are perspective views of an aircraft incorporating an adjustable elevator spring system according to some embodiments.
Figure 4B:
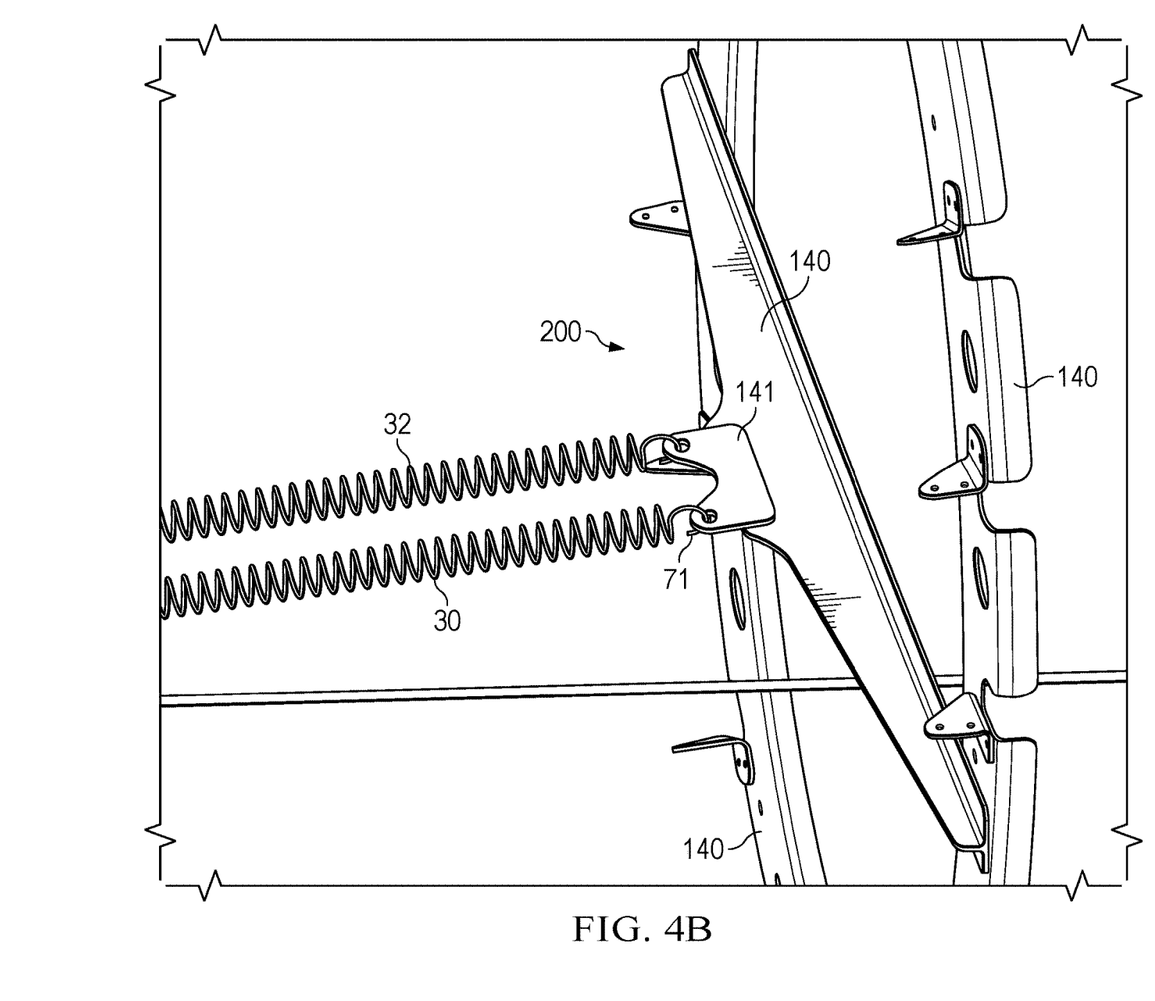
Figure 6:
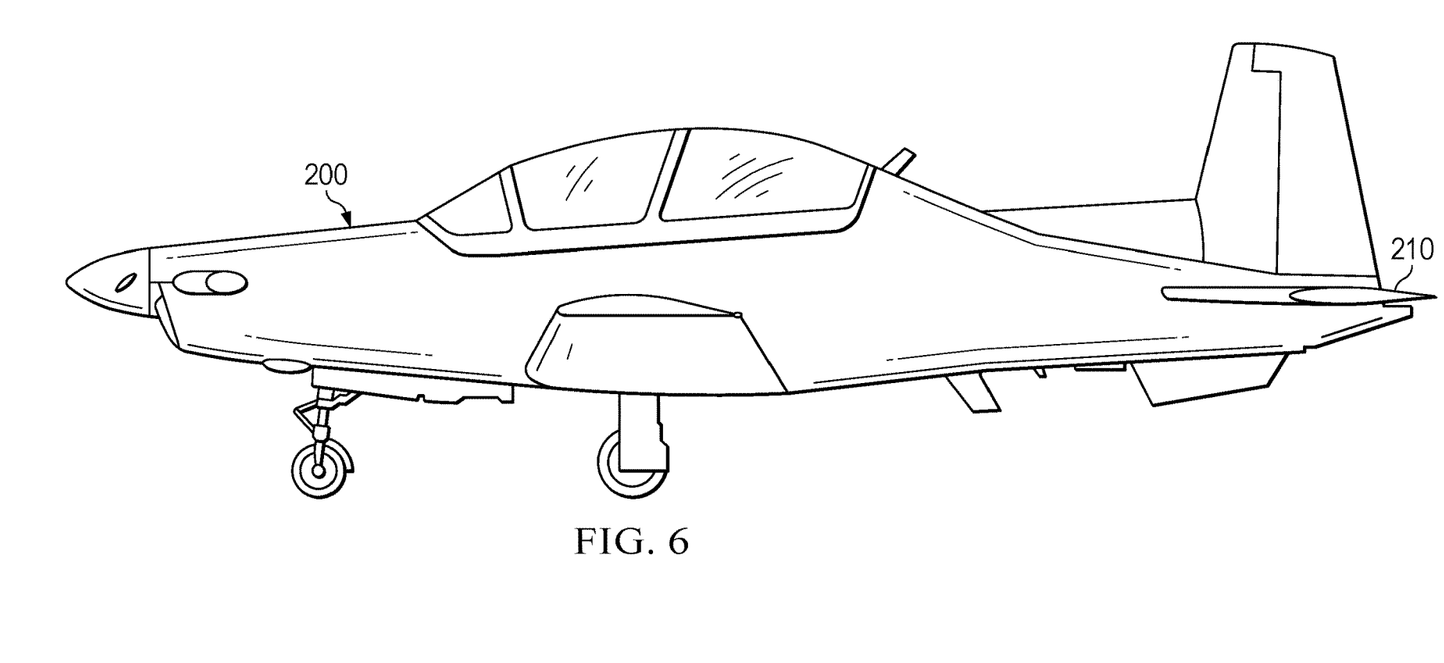
FIG. 6 is a side view of an aircraft incorporating an adjustable elevator spring system according to some embodiments.

FIG. 1 is perspective view of an adjustable spring link 20 according to some embodiments. FIG. 2 is side view of the adjustable spring link 20 of FIG. 1. FIG. 3 is perspective view of two adjustable spring links 20, 22 mechanically coupled to example elevator components according to some embodiments. As an example of the application and use of an embodiment, FIG. 6 is a side view of an aircraft 200 having an elevator 210. FIGS. 4A and 4B are perspective views showing portions of the aircraft 200 of FIG. 6, incorporating an adjustable elevator spring system according to some embodiments.

In some embodiments, an adjustable spring link 20 may be attached to a fixed bracket 24 of an elevator control member 26 on which the adjustable spring link 20 can freely pivot or rotate, and one of the selectable attachment points on the adjustable spring link 20 may be attached to an extension spring or an elevator spring 30. There may be multiple spring attachment holes 41, 42, 43, 44, 45 in the adjustable spring link 20 that allow install of the elevator spring 30, which may be an extension spring, to be tailored to each individual spring, each individual elevator control linkage or system, or each individual aircraft. The shape of the adjustable spring link 20 may allow the use of any adjustment position without changing any part of the configuration for the existing elevator linkage system, other than where the elevator spring 30 attaches to the link 20, for example.

Referring to FIGS. 4A and 4B, for example, the adjustable spring link 20 of some embodiments may be configured to provide a mechanical coupling interposed between an elevator spring 30 of the aircraft and an elevator control member 26 of the aircraft, and the adjustable spring link 20 may be configured to provide multiple spring expansion lengths by providing multiple spring attachment options for the elevator spring 30 via a set of spring attachment holes 41, 42, 43, 44, 45 in the adjustable spring link 20. In another embodiment, an adjustable spring link may provide a mechanical coupling interposed between an elevator spring of the aircraft and a structural frame member of the aircraft, while still being configured to provide multiple spring expansion lengths by providing multiple spring attachment options for the elevator spring via a set of spring attachment points or holes in the adjustable spring link.

For the embodiment shown in FIGS. 1 and 2 for example, an adjustable spring link 20 includes a main attachment flange portion 50 having a main attachment hole 40 therethrough, a first spring attachment flange portion 51 having a first spring attachment hole 41 therethrough, a second spring attachment flange portion 52 having a second spring attachment hole 42 therethrough, a third spring attachment flange portion 53 having a third spring attachment hole 43 therethrough, a fourth spring attachment flange portion 54 having a fourth spring attachment hole 44 therethrough, and a fifth spring attachment flange portion 55 having a fifth spring attachment hole 45 therethrough. Thus, the adjustable spring link 20 shown in FIGS. 1 and 2, for example, has five spring attachment locations, which may provide five different extensions of a same elevator spring attached to and secured by the adjustable spring link. Other embodiments may have a different number of spring attachment points, a different configuration and arrangement of the spring attachment points, a different spacing or adjustment amounts provided by the spring attachment points, or any combination thereof, for example. For example, an embodiment may have a first set of spring attachment points on one side of the adjustable spring link and a second set of spring attachment points on an opposite side of the adjustable spring link, and the second set of spring attachment points can be offset relative to the first set of spring attachment points, such that the second set of spring attachment points provides spring extension distances between those of the first set of spring attachment points, thereby providing a greater number of spring extension options and more adjustability.

Referring to FIG. 2, the first spring attachment hole 41 may be separated from the main attachment hole 40 by a first spaced distance 61. The second spring attachment hole 42 may be separated from the main attachment hole 40 by a second spaced distance 62. The third spring attachment hole 43 may be separated from the main attachment hole 40 by a third spaced distance 63. The fourth spring attachment hole 44 may be separated from the main attachment hole 40 by a fourth spaced distance 64. The fifth spring attachment hole 45 may be separated from the main attachment hole 40 by a fifth spaced distance 65. The first spaced distance 61 may be greater than the second, third, fourth, and fifth spaced distances 62, 63, 64, 65. The second spaced distance 62 may be greater than the third, fourth, and fifth spaced distances 63, 64, 65. The third spaced distance 63 may be greater than the fourth and fifth spaced distances 64, 65. The fourth spaced distance 64 may be greater than the fifth spaced distance 65. Thus, the five spring attachment points may provide five different spring extensions for a same elevator spring depending upon which of the spring attachment points is selected and used for attaching and securing an end 72 of the elevator spring 30, for example. In other embodiments, there may be more or less spring attachment locations, or spring attachment points that are more closely or more widely spaced, which may be dependent on system specifications or design choices, for example.

Still referring to FIG. 2, the first, second, third, fourth, and fifth spring attachment holes 41, 42, 43, 44, 45 may be configured along a generally arc shape, for example. The geometry and the configuration of the adjustable spring link 20 may allow for adequate clearance of an elevator spring 30 in any position and may allow for a wide range of spring tolerances. A main attachment hole center of the main attachment hole 40 and a first spring attachment hole center of the first spring attachment hole 41 are disposed along a first geometric line 81. The main attachment hole center of the main attachment hole 40 and a second spring attachment hole center of the second spring attachment hole 42 are disposed along a second geometric line 82. A first angle 91 between the first geometric line 81 and the second geometric line 82 may be 10 degrees.

The first spring attachment flange portion 51 may have a first top surface 101. A first surface distance 111 between the first top surface 101 of the first spring attachment flange portion 51 and the second geometric line 82 may be configured to be greater than half of a width 116 of the elevator spring 30 of the aircraft to provide a first spring clearance between the elevator spring 30 of the aircraft and the first top surface 101 of the first spring attachment flange portion 51 while the elevator spring 30 is attached via the second spring attachment hole 42. For example, an end 72 of an elevator spring 30 is shown attached to a second spring attachment hole 42 in FIG. 2 to illustrate a first spring clearance that may be provided by an adjustable spring link 20 according to an example embodiment.

Although 10 degrees is stated for the first angle 91, the first angle 91 may be approximately 10 degrees or within some range of substantially equivalent angles, such as in a range from about 8 degrees to about 12 degrees, for example, while still providing sufficient spacing at the first surface distance 111 to allow for a sufficient first spring clearance for a given elevator spring 30 installed or attached at the second spring attachment hole 42 according to some embodiments.

Still referring to FIG. 2, the main attachment hole center of the main attachment hole 40 and a third spring attachment hole center of the third spring attachment hole 43 are disposed along a third geometric line 83. A second angle 92 between the second geometric line 82 and the third geometric line 83 may be 14 degrees. The second spring attachment flange portion 52 may have a second top surface 102. A second surface distance 112 between the second top surface 102 of the second spring attachment flange portion 52 and the third geometric line 83 may be configured to be greater than the half width 116 of the elevator spring 30 of the aircraft to provide a second spring clearance between the elevator spring 30 and the second top surface 102 of the second spring attachment flange portion 52 while the elevator spring 30 is attached via the third spring attachment hole 43, for example.

Although 14 degrees is stated for the second angle 92, the second angle 92 may be approximately 14 degrees or within some range of substantially equivalent angles, such as in a range from about 12 degrees to about 16 degrees, for example, while still providing sufficient spacing at the second surface distance 112 to allow for a sufficient second spring clearance for a given elevator spring 30 installed or attached at the third spring attachment hole 43 according to some embodiments.

Still referring to FIG. 2, the main attachment hole center of the main attachment hole 40 and a fourth spring attachment hole center of the fourth spring attachment hole 44 are disposed along a fourth geometric line 84. A third angle 93 between the third geometric line 83 and the fourth geometric line 84 may be 20 degrees. The third spring attachment flange portion 53 may have a third top surface 103. A third surface distance 113 between the third top surface 103 of the third spring attachment flange portion 53 and the fourth geometric line 84 may be configured to be greater than the half width 116 of the elevator spring 30 of the aircraft to provide a third spring clearance between the elevator spring 30 and the third top surface 103 of the third spring attachment flange portion 53 while the elevator spring 30 is attached via the fourth spring attachment hole 44, for example.

Although 20 degrees is stated for the third angle 93, the third angle 93 may be approximately 20 degrees or within some range of substantially equivalent angles, such as in a range from about 18 degrees to about 22 degrees, for example, while still providing sufficient spacing at the third surface distance 113 to allow for a sufficient third spring clearance for a given elevator spring 30 installed or attached at the fourth spring attachment hole 44 according to some embodiments.

Still referring to FIG. 2, the main attachment hole center of the main attachment hole 40 and a fifth spring attachment hole center of the fifth spring attachment hole 45 are disposed along a fifth geometric line 85. A fourth angle 94 between the fourth geometric line 84 and the fifth geometric line 85 may be 34 degrees. The fourth spring attachment flange portion 54 may have a fourth top surface 104. A fourth surface distance 114 between the fourth top surface 104 of the fourth spring attachment flange portion 54 and the fifth geometric line 85 may be configured to be greater than the half width 116 of the elevator spring 30 of the aircraft to provide a fourth spring clearance between the elevator spring 30 and the fourth top surface 104 of the fourth spring attachment flange portion 54 while the elevator spring 30 is attached via the fifth spring attachment hole 45, for example.

Although 34 degrees is stated for the fourth angle 94, the fourth angle 94 may be approximately 34 degrees or within some range of substantially equivalent angles, such as in a range from about 32 degrees to about 36 degrees, for example, while still providing sufficient spacing at the fourth surface distance 114 to allow for a sufficient fourth spring clearance for a given elevator spring 30 installed or attached at the fifth spring attachment hole 45 according to some embodiments.

Still referring to FIG. 2, the second spring attachment flange portion 52 may have a first side surface 121. A first surface angle 131 between the first top surface 101 of the first spring attachment flange portion 51 and the first side surface 121 of the second spring attachment flange portion 52 may be 90 degrees, for example. Providing the first surface angle 131 at 90 degrees may provide a good clearance pocket or region at and adjacent to the first surface angle 131 for the elevator spring 30 when the elevator spring 30 is attached via the second spring attachment hole 42, as illustrated in FIG. 2 for example.

The third spring attachment flange portion 53 may have a second side surface 122. A second surface angle 132 between the second top surface 102 of the second spring attachment flange portion 52 and the second side surface 122 of the third spring attachment flange portion 53 may be 90 degrees, for example. The fourth spring attachment flange portion 54 may have a third side surface 123. A third surface angle 133 between the third top surface 103 of the third spring attachment flange portion 53 and the third side surface 123 of the fourth spring attachment flange portion 54 may be 90 degrees, for example. The fifth spring attachment flange portion 55 may have a fourth side surface 124. A fourth surface angle 134 between the fourth top surface 104 of the fourth spring attachment flange portion 54 and the fourth side surface 124 of the fifth spring attachment flange portion 55 may be 90 degrees, for example.

Although 90 degrees is stated for the first, second, third, and fourth surface angles 131, 132, 133, 134, 135 of an example embodiment, any, all, or any combination of the first, second, third, and fourth surface angles 131, 132, 133, 134, 135 may be approximately 90 degrees or within some range of substantially equivalent angles, such as in a range from about 85 degrees to about 95 degrees, for example, while still providing sufficient spacing for a given elevator spring 30 installed or attached at the second, third, fourth, or fifth spring attachment holes 42, 43, 44, 45, respectively, according to some embodiments. In some embodiments, the geometry and layout of the adjustable spring link may allow for clearance between portions or flanges of the adjustable spring link and the extension spring in all positions for which the extension spring may be attached to the adjustable spring link. In other embodiments, any, all, or any combination of the first, second, third, and fourth surface angles 131, 132, 133, 134, 135 may be different angles than the examples provided herein.

In some embodiments, the main attachment hole 40, the first spring attachment hole 41, the second spring attachment hole 42, the third spring attachment hole 43, the fourth spring attachment hole 44, and the fifth spring attachment hole 45 may be through holes formed through a single integral metal plate of an adjustment spring link 20. In some embodiments, any, all, or any combination of the main attachment hole 40, the first spring attachment hole 41, the second spring attachment hole 42, the third spring attachment hole 43, the fourth spring attachment hole 44, and the fifth spring attachment hole 45 may be blind holes, such as threaded holes configured to receive a screw of a spring attachment bracket or a spring fastener, for example. Although an example embodiment shows spring attachment holes, in other embodiments the spring attachment holes may be substituted with spring attachment points that are not through holes. In some embodiments, any, all, or any combination of the main attachment point, the first spring attachment point, the second spring attachment point, the third spring attachment point, the fourth spring attachment point, and the fifth spring attachment point may be a notch, a hook portion, a loop extension, a bracket attachment point, a designated or marked fastener attachment point, or any combination thereof, for example.

Referring to FIGS. 3, 4A, and 4B, an aircraft may have structural frame member 140, such as an intercostal structural member. A first end 71 of the elevator spring 30 may be mechanically coupled to a structural frame member 140 of the aircraft via a first interposing bracket 141. In some embodiments, an aircraft or an elevator downforce linkage system may have two elevator springs 30, 32. Two springs may provide a redundancy for safety in case one of the springs breaks or fails. Because of the structural frame member locations suitable for spring attachment relative to the elevator or other elevator linkages, or because of length requirements of the springs, it may be difficult to achieve design specifications and functionality with only one spring. For example, the pull force specified per a given design or configuration of a given aircraft may call for a spring rate or spring force that would be too large for a single spring while still enabling a suitable extension length during use for a full range of motion for a given elevator mechanism or linkage to function suitably across an entire operational range, for example. Thus, for some embodiments, two extension springs may provide specified or suitable. In such cases, two adjustment spring links may be implemented for some embodiments. In some embodiments, one spring and one adjustable spring link may be suitable. In some embodiments, two or more springs and corresponding two or more adjustable spring links may be suitable. In some embodiments, one adjustable spring link may be configured and suitable for two or more springs.

In some embodiments, a second end 72 of an elevator spring 30 may be mechanically coupled to an elevator control member 26 via an adjustable spring link 20. In some embodiments, an adjustable spring link 20 may be mechanically coupled to an elevator control member 26 via a second interposing bracket 142. In some embodiments, two elevator springs 30, 32 may be included that are mechanically coupled to an elevator control member 26 via two adjustable spring links 20, 22, respectively. In some embodiments, an adjustable spring link may mechanically couple an elevator spring to an elevator control linkage.

Figure 5:
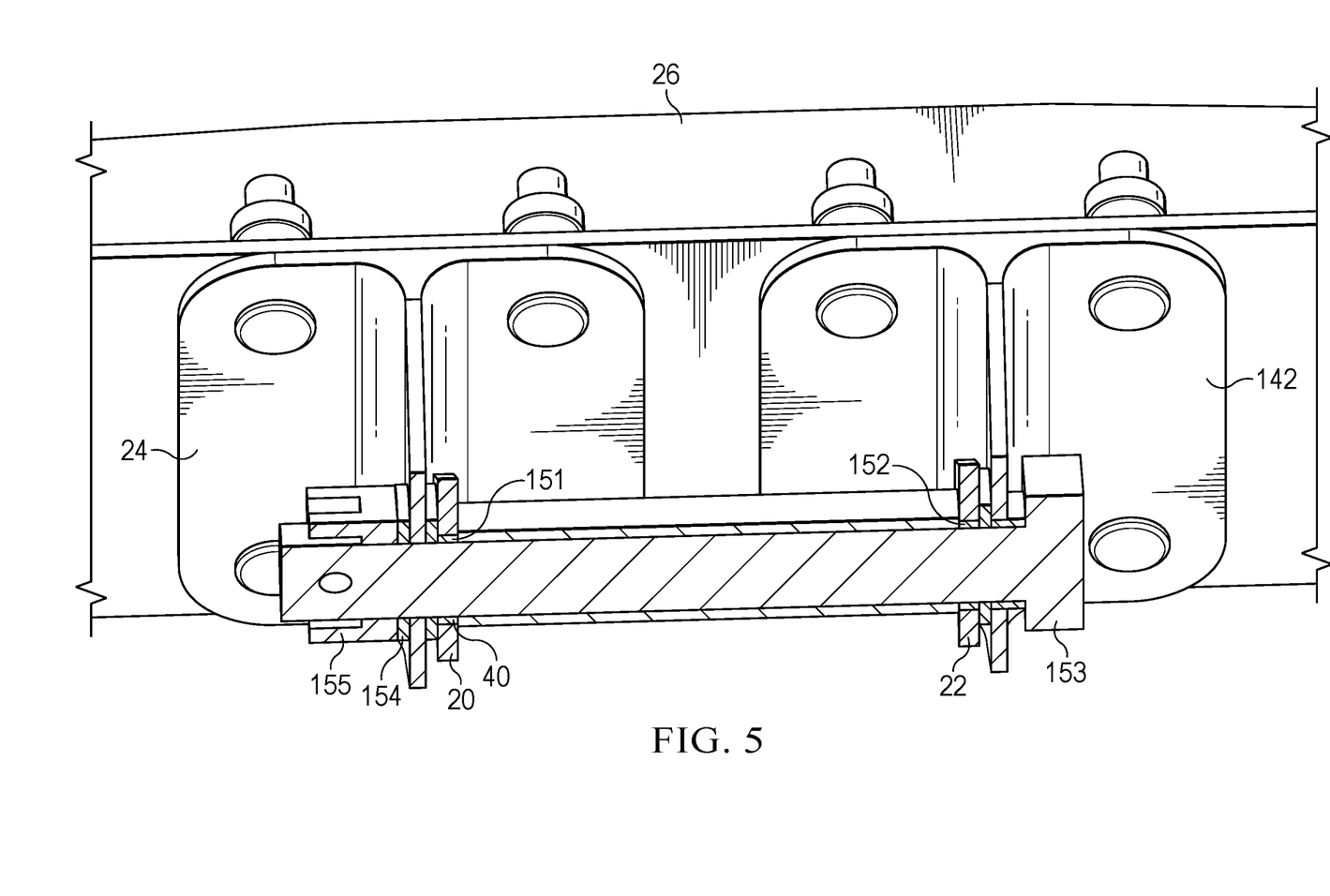
FIG. 5 is zoomed-in, perspective cross-section view of FIG. 3 taken along line 5-5.

FIG. 5 is zoomed-in, perspective cross-section view of FIG. 3 taken along line 5-5. Referring to FIGS. 3 and 5, for example, the adjustable spring links 20, 22 may be mechanically coupled to a second interposing bracket 142 of an elevator control linkage system via a first bushing 151, a second bushing 152, a bolt 153, washers 154, and a nut 155, for example. The first bushing 151 may be located in the first main attachment hole 40 of the first adjustable spring link 20. The second bushing 152 may be located in the second main attachment hole 40 of the second adjustable spring link 22. The bolt 153 may extend through the first bushing 151 and the first main attachment hole 40, such that the first bushing 151 is interposed between the bolt 153 and the first adjustable spring link 20, and such that the first adjustable spring link 20 is mechanically coupled to the elevator control member 26 via first bushing 151 and the bolt 153. The bolt 153 also may extend through the second bushing 152 and the second main attachment hole 40, such that the second bushing 152 is interposed between the bolt 153 and the second adjustable spring link 22, and such that the second adjustable spring link 22 is mechanically coupled to the elevator control member 26 via second bushing 152 and the bolt 153. The nut 155 may be threaded on the bolt 153 to retain the bolt 153. In some embodiments, the first and second bushings 151, 152 may be omitted, for example. In some embodiments, an adjustable spring link 20 may be mechanically coupled to a structural frame member or an elevator control member using any suitable fastener, linkage, mechanism, or any combination thereof, for example.

In some embodiments, the various portions of an adjustable spring link may be separate pieces joined or fastened together, by using bolts, rivets, screws, or other fasteners or other fastening techniques such as bonding, welding, adhesives, or the like, or any combination thereof, for example. In some embodiments, part, parts, or all of the portions of an adjustable spring link may be a single integral part, as opposed to multiple parts, such as being formed from a single integral plate, formed from a single billet or block, cast as a single integral part, forged as a single integral part, molded together, laid up as a single composite material sheet or plate, or any combinations thereof, for example.

In some embodiments, an adjustable spring link may be made from a single integral plate of 2024-T3 aluminum with the boundaries and the holes formed using machine tools, stamping, pressing, laser cutting, water jet cutting, drilling, end milling, or any combination thereof, for example. An adjustable spring link may be made from any suitable material, including but not necessarily limited to metal, steel, stainless steel, aluminum, titanium, bronze, brass, nickel, carbon fiber, fiberglass, titanium-carbon-fiber composite, structural composite material, carbon fiber reinforced polymers (CFRP), forged carbon composite, carbon nanotube composites (CNT), fiberglass reinforced polymers (FRP), glass fiber reinforced polymer (GFRP), aramid fiber composite, natural fiber composites, metal matrix composite, woven composite, various alloys thereof, various forgings thereof, or combinations thereof, for example.

In an example embodiment, an adjustable spring link may have a total length of 3.26 inches (82.8 mm) to 4 inches (101.6 mm), a plate thickness of 0.063 inches (1.6 mm), a total height of 1 inch (25.4 mm) to 1.5 inches (38.1 mm), a first space distance of 3.6640 inches (93.0656 mm), a second spaced distance of 2.8480 inches (72.3392 mm), a third spaced distance of 2.0320 inches (51.6128 mm), a fourth spaced distance of 1.2160 inches (30.8864 mm), a fifth spaced distance of 0.4000 inches (10.1600 mm), spring attachment holes with a diameter of 0.1200 inches (3.048 mm), and a main attachment hole with a diameter of 0.6000 inches (15.2400 mm), for example.

An adjustable spring link embodiment can include a main attachment flange portion, a first spring attachment flange portion, and a second spring attachment flange portion. In the embodiment, the main attachment flange portion can have a main attachment hole therein. In the embodiment, the first spring attachment flange portion can have a first spring attachment hole therein. In the embodiment, the second spring attachment flange portion can have a second spring attachment hole therein, where the first spring attachment hole is separated from the main attachment hole by a first spaced distance, where the second spring attachment hole is separated from the main attachment hole by a second spaced distance, where the first spaced distance is greater than the second spaced distance, where the adjustable spring link is configured to provide a mechanical coupling interposed between an elevator spring of an aircraft and either a structural frame member or an elevator control member of the aircraft, and where the adjustable spring link is configured to provide multiple spring expansion lengths by providing multiple spring attachment options for the elevator spring via the first spring attachment hole and the second spring attachment hole.

In some embodiments, a main attachment hole center of the main attachment hole and a first spring attachment hole center of the first spring attachment hole are disposed along a first geometric line. In some embodiments, the main attachment hole center and a second spring attachment hole center of the second spring attachment hole are disposed along a second geometric line, and where a first angle between the first geometric line and the second geometric line is in a range from 5 degrees to 90 degrees. In some embodiments, the first angle is less than 35 degrees.

In some embodiments, the link further includes a third spring attachment flange portion having a third spring attachment hole therein, a fourth spring attachment flange portion having a fourth spring attachment hole therein, and a fifth spring attachment flange portion having a fifth spring attachment hole therein. In some embodiments, the third spring attachment hole is separated from the main attachment hole by a third spaced distance. In some embodiments, the fourth spring attachment hole is separated from the main attachment hole by a fourth spaced distance. In some embodiments, the fifth spring attachment hole is separated from the main attachment hole by a fifth spaced distance. In some embodiments, the first spaced distance is greater than the third, fourth, and fifth spaced distances. In some embodiments, the second spaced distance is greater than the third, fourth, and fifth spaced distances. In some embodiments, the third spaced distance is greater than the fourth and fifth spaced distances, and where the fourth spaced distance is greater than the fifth spaced distance.

In some embodiments, the first, second, third, fourth, and fifth spring attachment holes are configured along a generally arc shape.

In some embodiments, a main attachment hole center of the main attachment hole and a first spring attachment hole center of the first spring attachment hole are disposed along a first geometric line. In some embodiments, the main attachment hole center and a second spring attachment hole center of the second spring attachment hole are disposed along a second geometric line. In some embodiments, a first angle between the first geometric line and the second geometric line is 10 degrees. In some embodiments, the main attachment hole center and a third spring attachment hole center of the third spring attachment hole are disposed along a third geometric line. In some embodiments, a second angle between the second geometric line and the third geometric line is 14 degrees. In some embodiments, the main attachment hole center and a fourth spring attachment hole center of the fourth spring attachment hole are disposed along a fourth geometric line. In some embodiments, a third angle between the third geometric line and the fourth geometric line is 20 degrees. In some embodiments, the main attachment hole center and a fifth spring attachment hole center of the fifth spring attachment hole are disposed along a fifth geometric line, and where a fourth angle between the fourth geometric line and the fifth geometric line is 34 degrees.

In some embodiments, the first spring attachment flange portion has a first top surface. In some embodiments, a first surface distance between the first top surface of the first spring attachment flange portion and the second geometric line is configured to be greater than half of a width of the elevator spring of the aircraft to provide a first spring clearance between the elevator spring of the aircraft and the first top surface of the first spring attachment flange portion while the elevator spring is attached via the second spring attachment hole. In some embodiments, the second spring attachment flange portion has a second top surface. In some embodiments, a second surface distance between the second top surface of the second spring attachment flange portion and the third geometric line is configured to be greater than half of the width of the elevator spring of the aircraft to provide a second spring clearance between the elevator spring of the aircraft and the second top surface of the second spring attachment flange portion while the elevator spring is attached via the third spring attachment hole. In some embodiments, the third spring attachment flange portion has a third top surface. In some embodiments, a third surface distance between the third top surface of the third spring attachment flange portion and the fourth geometric line is configured to be greater than half of the width of the elevator spring of the aircraft to provide a third spring clearance between the elevator spring of the aircraft and the third top surface of the third spring attachment flange portion while the elevator spring is attached via the fourth spring attachment hole. In some embodiments, the fourth spring attachment flange portion has a fourth top surface, and where a fourth surface distance between the fourth top surface of the fourth spring attachment flange portion and the fifth geometric line is configured to be greater than half of the width of the elevator spring of the aircraft to provide a fourth spring clearance between the elevator spring of the aircraft and the fourth top surface of the fourth spring attachment flange portion while the elevator spring is attached via the fifth spring attachment hole.

In some embodiments, the first spring attachment flange portion has a first top surface. In some embodiments, the second spring attachment flange portion has a first side surface. In some embodiments, a first surface angle between the first top surface of the first spring attachment flange portion and the first side surface of the second spring attachment flange portion is 90 degrees, and where a first surface distance between the first top surface of the first spring attachment flange portion and a second spring attachment hole center of the second spring attachment hole is configured to be greater than half of a width of the elevator spring of the aircraft to provide a first spring clearance between the elevator spring of the aircraft and the first top surface of the first spring attachment flange portion while the elevator spring is attached via the second spring attachment hole.

In some embodiments, the main attachment hole, the first spring attachment hole, and the second spring attachment hole are through holes. In some embodiments, the adjustable spring link is an integral plate. In some embodiments, the adjustable spring link is a metal plate.

An aircraft embodiment can include a structural frame member, an elevator control member, a first elevator spring, and a first adjustable spring link. In the embodiment, the first elevator spring can have a first spring end and a second spring end, and the first spring end of the first elevator spring can be mechanically coupled to and supported by the structural frame member. In the embodiment, the first adjustable spring link can have a first main attachment hole, a first spring attachment hole, and a second spring attachment hole. In the embodiment, the first spring attachment hole is separated from the first main attachment hole by a first spaced distance. In the embodiment, the second spring attachment hole is separated from the first main attachment hole by a second spaced distance. In the embodiment, the first spaced distance is greater than the second spaced distance. In the embodiment, the first adjustable spring link is mechanically coupled to the elevator control member via the first main attachment hole, and where the second spring end of the first elevator spring is mechanically coupled to the first adjustable spring link via the first spring attachment hole or the second spring attachment hole.

In some embodiments, the first adjustable spring link has a third spring attachment hole, a fourth spring attachment hole, and a fifth spring attachment hole. In some embodiments, the third spring attachment hole is separated from the first main attachment hole by a third spaced distance. In some embodiments, the fourth spring attachment hole is separated from the first main attachment hole by a fourth spaced distance. In some embodiments, the fifth spring attachment hole is separated from the first main attachment hole by a fifth spaced distance. In some embodiments, the first spaced distance is greater than the third, fourth, and fifth spaced distances. In some embodiments, the second spaced distance is greater than the third, fourth, and fifth spaced distances. In some embodiments, the third spaced distance is greater than the fourth and fifth spaced distances. In some embodiments, the fourth spaced distance is greater than the fifth spaced distance.

In some embodiments, the first, second, third, fourth, and fifth spring attachment holes are configured along a generally arc shape and are through holes.

In some embodiments, the aircraft further includes a first bushing located in the first main attachment hole of the first adjustable spring link, and a bolt extending through the first bushing and the first main attachment hole, such that the first bushing is interposed between the bolt and the first adjustable spring link, and such that the first adjustable spring link is mechanically coupled to the elevator control member via first bushing and the bolt.

In some embodiments, the aircraft further includes a second elevator spring, the second elevator spring having a third spring end and a fourth spring end, the third spring end of the second elevator spring being mechanically coupled to and supported by the structural frame member, and a second adjustable spring link having a second main attachment hole, a third spring attachment hole, and a fourth spring attachment hole. In some embodiments, the third spring attachment hole is separated from the second main attachment hole by a third spaced distance. In some embodiments, the fourth spring attachment hole is separated from the second main attachment hole by a fourth spaced distance. In some embodiments, the third spaced distance is greater than the fourth spaced distance. In some embodiments, the second adjustable spring link is mechanically coupled to the elevator control member via the second main attachment hole. In some embodiments, the fourth spring end of the second elevator spring is mechanically coupled to the second adjustable spring link via the third spring attachment hole or the fourth spring attachment hole.

In some embodiments, the aircraft further includes a first bushing located in the first main attachment hole of the first adjustable spring link, a bolt extending through the first bushing and the first main attachment hole, such that the first bushing is interposed between the bolt and the first adjustable spring link, and such that the first adjustable spring link is mechanically coupled to the elevator control member via first bushing and the bolt, and a second bushing located in the second main attachment hole of the second adjustable spring link. In some embodiments, the bolt extends through the second bushing and the second main attachment hole, such that the second bushing is interposed between the bolt and the second adjustable spring link, and such that the second adjustable spring link is mechanically coupled to the elevator control member via second bushing and the bolt.

In some embodiments, the structural frame member is an intercostal structural member. In some embodiments, a first interposing bracket is interposed between the first elevator spring and the intercostal structural member, and where a second interposing bracket is interposed between the first adjustable spring link and the elevator control member.

In some embodiments, the elevator control member is an elevator control linkage.

An aircraft embodiment can include a structural frame member, an elevator control member, an elevator spring, and an adjustable spring link. In the embodiment, the adjustable spring link can include a main attachment flange portion, a first spring attachment flange portion, and a second spring attachment flange portion. In the embodiment, the main attachment flange portion can have a main attachment point. In the embodiment, the first spring attachment flange portion can have a first spring attachment point. In the embodiment, the second spring attachment flange portion can have a second spring attachment point, where the first spring attachment point is separated from the main attachment point by a first spaced distance, where the second spring attachment point is separated from the main attachment point by a second spaced distance, where the first spaced distance is greater than the second spaced distance, where the adjustable spring link is configured to provide a mechanical coupling interposed between the elevator spring and either the structural frame member or the elevator control member, and where the adjustable spring link is configured to provide multiple spring expansion lengths by providing multiple spring attachment options for the elevator spring via the first spring attachment point and the second spring attachment point.

While illustrative and example embodiments have been described with reference to illustrative drawings, this description is not intended to be construed in a limiting sense. Various modifications and combinations of the illustrative and example embodiments, as well as other embodiments, may be apparent to persons skilled in the pertinent art upon referencing the present disclosure. It is therefore intended that the appended claims encompass any and all of such modifications, equivalents, or embodiments.

What is claimed is:

1. An adjustable spring link, comprising:
a main attachment flange portion having a main attachment hole therein;
a first spring attachment flange portion having a first spring attachment hole therein; and
a second spring attachment flange portion having a second spring attachment hole therein, wherein the first spring attachment hole is separated from the main attachment hole by a first spaced distance, wherein the second spring attachment hole is separated from the main attachment hole by a second spaced distance, wherein the first spaced distance is greater than the second spaced distance, wherein the adjustable spring link is configured to provide a mechanical coupling interposed between an elevator spring of an aircraft and either a structural frame member or an elevator control member of the aircraft, and wherein the adjustable spring link is configured to provide multiple spring expansion lengths by providing multiple spring attachment options for the elevator spring via the first spring attachment hole and the second spring attachment hole.

2. The link of claim 1, wherein a main attachment hole center of the main attachment hole and a first spring attachment hole center of the first spring attachment hole are disposed along a first geometric line;
wherein the main attachment hole center and a second spring attachment hole center of the second spring attachment hole are disposed along a second geometric line; and
wherein a first angle between the first geometric line and the second geometric line is in a range from 5 degrees to 90 degrees.

3. The link of claim 2, wherein the first angle is less than 35 degrees.

4. The link of claim 1, further comprising:
a third spring attachment flange portion having a third spring attachment hole therein;
a fourth spring attachment flange portion having a fourth spring attachment hole therein; and
a fifth spring attachment flange portion having a fifth spring attachment hole therein, wherein the third spring attachment hole is separated from the main attachment hole by a third spaced distance,
wherein the fourth spring attachment hole is separated from the main attachment hole by a fourth spaced distance,
wherein the fifth spring attachment hole is separated from the main attachment hole by a fifth spaced distance,
wherein the first spaced distance is greater than the third, fourth, and fifth spaced distances,
wherein the second spaced distance is greater than the third, fourth, and fifth spaced distances,
wherein the third spaced distance is greater than the fourth and fifth spaced distances, and
wherein the fourth spaced distance is greater than the fifth spaced distance.

5. The link of claim 4, wherein the first, second, third, fourth, and fifth spring attachment holes are configured along a generally arc shape.

6. The link of claim 5, wherein a main attachment hole center of the main attachment hole and a first spring attachment hole center of the first spring attachment hole are disposed along a first geometric line;
wherein the main attachment hole center and a second spring attachment hole center of the second spring attachment hole are disposed along a second geometric line;
wherein a first angle between the first geometric line and the second geometric line is 10 degrees;

wherein the main attachment hole center and a third spring attachment hole center of the third spring attachment hole are disposed along a third geometric line;

wherein a second angle between the second geometric line and the third geometric line is 14 degrees;

wherein the main attachment hole center and a fourth spring attachment hole center of the fourth spring attachment hole are disposed along a fourth geometric line;

wherein a third angle between the third geometric line and the fourth geometric line is 20 degrees;

wherein the main attachment hole center and a fifth spring attachment hole center of the fifth spring attachment hole are disposed along a fifth geometric line; and wherein a fourth angle between the fourth geometric line and the fifth geometric line is 34 degrees.

7. The link of claim 6, wherein the first spring attachment flange portion has a first top surface;

wherein a first surface distance between the first top surface of the first spring attachment flange portion and the second geometric line is configured to be greater than half of a width of the elevator spring of the aircraft to provide a first spring clearance between the elevator spring of the aircraft and the first top surface of the first spring attachment flange portion while the elevator spring is attached via the second spring attachment hole;

wherein the second spring attachment flange portion has a second top surface;

wherein a second surface distance between the second top surface of the second spring attachment flange portion and the third geometric line is configured to be greater than half of the width of the elevator spring of the aircraft to provide a second spring clearance between the elevator spring of the aircraft and the second top surface of the second spring attachment flange portion while the elevator spring is attached via the third spring attachment hole;

wherein the third spring attachment flange portion has a third top surface;

wherein a third surface distance between the third top surface of the third spring attachment flange portion and the fourth geometric line is configured to be greater than half of the width of the elevator spring of the aircraft to provide a third spring clearance between the elevator spring of the aircraft and the third top surface of the third spring attachment flange portion while the elevator spring is attached via the fourth spring attachment hole;

wherein the fourth spring attachment flange portion has a fourth top surface; and wherein a fourth surface distance between the fourth top surface of the fourth spring attachment flange portion and the fifth geometric line is configured to be greater than half of the width of the elevator spring of the aircraft to provide a fourth spring clearance between the elevator spring of the aircraft and the fourth top surface of the fourth spring attachment flange portion while the elevator spring is attached via the fifth spring attachment hole.

8. The link of claim 1, wherein the first spring attachment flange portion has a first top surface;

wherein the second spring attachment flange portion has a first side surface;

wherein a first surface angle between the first top surface of the first spring attachment flange portion and the first side surface of the second spring attachment flange portion is 90 degrees; and wherein a first surface distance between the first top surface of the first spring attachment flange portion and a second spring attachment hole center of the second spring attachment hole is configured to be greater than half of a width of the elevator spring of the aircraft to provide a first spring clearance between the elevator spring of the aircraft and the first top surface of the first spring attachment flange portion while the elevator spring is attached via the second spring attachment hole.

9. The link of claim 1, wherein the main attachment hole, the first spring attachment hole, and the second spring attachment hole are through holes.

10. The link of claim 1, wherein the adjustable spring link is an integral plate.

11. The link of claim 10, wherein the adjustable spring link is a metal plate.

12. An aircraft, comprising:
a structural frame member;
an elevator control member;
a first elevator spring, the first elevator spring having a first spring end and a second spring end, the first spring end of the first elevator spring being mechanically coupled to and supported by the structural frame member; and
a first adjustable spring link having a first main attachment hole, a first spring attachment hole, and a second spring attachment hole, wherein the first spring attachment hole is separated from the first main attachment hole by a first spaced distance, wherein the second spring attachment hole is separated from the first main attachment hole by a second spaced distance, wherein the first spaced distance is greater than the second spaced distance, wherein the first adjustable spring link is mechanically coupled to the elevator control member via the first main attachment hole, and wherein the second spring end of the first elevator spring is mechanically coupled to the first adjustable spring link via the first spring attachment hole or the second spring attachment hole.

13. The aircraft of claim 12, wherein the first adjustable spring link has a third spring attachment hole, a fourth spring attachment hole, and a fifth spring attachment hole;

wherein the third spring attachment hole is separated from the first main attachment hole by a third spaced distance;

wherein the fourth spring attachment hole is separated from the first main attachment hole by a fourth spaced distance;

wherein the fifth spring attachment hole is separated from the first main attachment hole by a fifth spaced distance;

wherein the first spaced distance is greater than the third, fourth, and fifth spaced distances;

wherein the second spaced distance is greater than the third, fourth, and fifth spaced distances;

wherein the third spaced distance is greater than the fourth and fifth spaced distances; and wherein the fourth spaced distance is greater than the fifth spaced distance.

14. The aircraft of claim 13, wherein the first, second, third, fourth, and fifth spring attachment holes are configured along a generally arc shape and are through holes.

15. The aircraft of claim 12, further comprising:
a first bushing located in the first main attachment hole of the first adjustable spring link; and
a bolt extending through the first bushing and the first main attachment hole, such that the first bushing is interposed between the bolt and the first adjustable spring link, and such that the first adjustable spring link is mechanically coupled to the elevator control member via first bushing and the bolt.

16. The aircraft of claim 12, further comprising:
a second elevator spring, the second elevator spring having a third spring end and a fourth spring end, the third spring end of the second elevator spring being mechanically coupled to and supported by the structural frame member; and
a second adjustable spring link having a second main attachment hole, a third spring attachment hole, and a fourth spring attachment hole, wherein the third spring attachment hole is separated from the second main attachment hole by a third spaced distance, wherein the fourth spring attachment hole is separated from the second main attachment hole by a fourth spaced distance, wherein the third spaced distance is greater than the fourth spaced distance, wherein the second adjustable spring link is mechanically coupled to the elevator control member via the second main attachment hole, and wherein the fourth spring end of the second elevator spring is mechanically coupled to the second adjustable spring link via the third spring attachment hole or the fourth spring attachment hole.

17. The aircraft of claim 16, further comprising:
a first bushing located in the first main attachment hole of the first adjustable spring link;
a bolt extending through the first bushing and the first main attachment hole, such that the first bushing is interposed between the bolt and the first adjustable spring link, and such that the first adjustable spring link is mechanically coupled to the elevator control member via first bushing and the bolt; and
a second bushing located in the second main attachment hole of the second adjustable spring link, wherein the bolt extends through the second bushing and the second main attachment hole, such that the second bushing is interposed between the bolt and the second adjustable spring link, and such that the second adjustable spring link is mechanically coupled to the elevator control member via second bushing and the bolt.

18. The aircraft of claim 12, wherein the structural frame member is an intercostal structural member;
wherein a first interposing bracket is interposed between the first elevator spring and the intercostal structural member; and
wherein a second interposing bracket is interposed between the first adjustable spring link and the elevator control member.

19. The aircraft of claim 12, wherein the elevator control member is an elevator control linkage.

20. An aircraft, comprising:
a structural frame member;
an elevator control member;
an elevator spring; and
an adjustable spring link comprising
a main attachment flange portion having a main attachment point,
a first spring attachment flange portion having a first spring attachment point, and
a second spring attachment flange portion having a second spring attachment point, wherein the first spring attachment point is separated from the main attachment point by a first spaced distance, wherein the second spring attachment point is separated from the main attachment point by a second spaced distance, wherein the first spaced distance is greater than the second spaced distance, wherein the adjustable spring link is configured to provide a mechanical coupling interposed between the elevator spring and either the structural frame member or the elevator control member, and wherein the adjustable spring link is configured to provide multiple spring expansion lengths by providing multiple spring attachment options for the elevator spring via the first spring attachment point and the second spring attachment point.

* * * * *